(12) United States Patent
Yagasaki et al.

(10) Patent No.: US 6,334,830 B1
(45) Date of Patent: Jan. 1, 2002

(54) METAL V-BELT

(75) Inventors: Tooru Yagasaki; Shigeru Kanehara; Hideaki Aoyama, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/426,756

(22) Filed: Oct. 26, 1999

(30) Foreign Application Priority Data

Dec. 24, 1998 (JP) .................................................. 10-367661

(51) Int. Cl.⁷ ................................. F16G 1/22; F16G 5/16
(52) U.S. Cl. ........................... 474/242; 474/240; 474/201
(58) Field of Search ..................................... 474/242, 240, 474/237, 244, 243, 201, 265, 272

(56) References Cited

U.S. PATENT DOCUMENTS

| 5,004,450 A | * | 4/1991 | Ide | 474/242 |
| 5,152,722 A | * | 10/1992 | Yamada | 474/240 |
| 5,439,422 A | * | 8/1995 | Smeets | 474/242 |

FOREIGN PATENT DOCUMENTS

| EP | 0 377 918 | | 7/1990 | |
| EP | 0 562 654 | | 9/1993 | |
| JP | 62-37645 | | 3/1987 | |
| JP | 280946 | * | 11/1988 | 474/242 |
| JP | 98733 | * | 4/1989 | 474/242 |
| JP | 229038 | * | 4/1989 | 474/242 |
| JP | 2-225840 | | 9/1990 | |
| JP | 5-8359 | | 3/1993 | |
| JP | 6-10993 | | 1/1994 | |

OTHER PUBLICATIONS

Patent Abstracts of Japan, vol. 1999, No. 3, Mar. 31, 1999 and JP 10 331920, Dec. 15, 1998.

* cited by examiner

*Primary Examiner*—Thomas R. Hannon
*Assistant Examiner*—Marcus Charles
(74) *Attorney, Agent, or Firm*—Arent Fox Kintner Plotkin & Kahn, PLLC

(57) ABSTRACT

A metal V-belt comprising an endless metal ring member 14 and a plurality of metal element members 10 supported along said metal ring member wherein the clearance between a slot portion S of the metal element members 10 and the endless metal ring member 14 is set larger than the clearance in the thickness direction of the belt between the concave and convex portions of a coupling portion 5 used for linking disposed on the front and rear surfaces of the metal element members 10. This controls damage to the metal ring member caused by contact between the metal ring member outermost periphery of the metal V-belt used in, for example, an infinite variable-speed drive and the metal element members.

3 Claims, 8 Drawing Sheets

METAL V-BELT

RELATED APPLICATIONS

The application claims the priority of Japanese Patent Application No.10-367661 filed on Dec. 24, 1998, which is incorporated herein by reference.

FIELD OF THE INVENTION

The present invention is related to a metal V-belt used as a power transmission means in a V-belt infinite variable-speed drive and in particular to a metal V-belt that comprises metal elements.

BACKGROUND OF THE INVENTION

This type of metal V-belt has been proposed many times from the past and as shown in FIG. 8 is comprised by, for example, an endless belt shaped metal ring 14 and a plurality of metal element members 80 supported along the metal ring member. Further, this metal V-belt transmits power between a drive pulley 11 and a driven pulley 12. Both of these pulleys 11, 12 can variably control the V-channel width and by means of variably controlling the V-channel width of both pulleys, the wrapping radius of the metal V-belt on both pulleys can be changed and the change gear ratio between the drive axle and driven axle changed in infinite steps.

As shown in FIG. 9 for example, the metal element members 80 are comprised by a neck portion 7 that joins the gap between a body portion 3 and a head portion 4. Slot portions are formed on both sides of the neck portion 7 which accept the metal ring members 14. A saddle surface 1 is formed on the upper portion of the body portion 3 making contact with the metal ring members 14 at the winding regions of the drive pulley and the driven pulley. A V-surface 2 is also formed on both sides of the body portion 3 making contact with the V-channel. In contrast, an ear portion 86 is drawn to the left and right on the left and right sides of the head portion 4 (upper portion of slot). This ear portion 86 prevents the metal element members from detaching from the metal ring member.

Further, an endless ring shaped metal V-belt is formed by means of accepting the metal ring members 14 in a slot formed by the saddle surface and the ear portion and, as shown in FIG. 8, joining the plurality of metal elements. When lining up the metal element members 80 at the approximate center of the head portion 4 as a plurality of a push type members, an approximate cylindrical shaped convex portion 5 and concave portion (not shown in figure) which are called couplings are formed on the front and rear surfaces of the belt in the travel direction in order to join and position the front and rear metal element members. Then, a composition is made in which the linear portion between the two pulleys is positioned continuously by means of joining the convex portion and concave portion of the front and rear surfaces of the metal element members to each other.

An slanted surface 20 (or recessed surface) is formed on the front surface of the metal element member at the pulley winding region such that is does not interfere with the body portion and a rocking edge 21 that is formed by this slanted surface and the front surface at the pulley winding region functions as a pitch circle pressing on the front and rear metal element members. Further, in the following description the metal element members will be referred to as members and the metal ring member as a ring.

In this type of metal V-belt the driving force transmits to the driven pulley 12 by means of the elements which are protruding from the drive pulley 11 outlet being positioned by joining the convex portion and concave portion of the front and rear elements which then functions as push type members. Therefore, a compressive force acts on each element at the arcing portion of the belt directed from the drive pulley to the driven pulley without any clearance occurring between the front and rear elements. In contrast, an expansive force is applied to the ring member at the arcing portion of the belt directed from the driven pulley to the drive pulley although no mutual tensile force occurs because each of the elements are gathered together in a plate shaped body. In addition, because almost all the clearance between every element is gathered at this portion, a fixed amount of clearance occurs between the elements at this return region.

Unevenness occurs in the gaps between each element close to the driven pulley outlet when this clearance is left as is without changes and as a result, the elements protruding from the driven pulley outlet enter the drive pulley inlet while there is still clearance. Consequently, a large amount of slippage occurs in the drive pulley from the difference in the speeds of the drive pulley inlet and outlet causing problems such as friction of the pulleys and elements and decreases in the power transmission efficiency.

Thereupon, this type of metal belt requires each element to be comprised to promote clearance closure movement. This clearance closure movement is a movement that functions to join the elements (protruding from the driven pulley) with the elements closest to the drive pulley just before the elements (protruding from the driven pulley) are inserted into the drive pulley in the early stage in the driven pulley outlet arcing region.

A method has been disclosed for this clearance reducing motion in, for example, Japanese Laid-open Patent Publication No.02-225840(A) in which the composition is such that the center of gravity of transverse elements (elements) are positioned at the outside in the radial direction close to the slanting region of the transverse elements or against the elements thereby maintaining the impact force when the transverse elements protrude from the driven pulley. As a result of this impact force, the transverse elements are mutually joined at the return portion without any play and then mutually fit into the drive pulley without any play.

Further, this type of metal V-belt is already being used for practical applications although in its present state there are requests for improvements in the power transmission efficiency and improvements in the durability. To respond to these types of improvements several methods have been disclosed in, for example, Japanese Utility Model Publication No.05-008359(B), Japanese Laid-Open Utility Model Publication No.62-037645(A) and Japanese Laid-open Patent Publication No.06-010993(A).

From among these applications the method disclosed in Japanese Utility Model Publication No.05-008359(B) is one wherein the elements separated from the pulley at the driven pulley outlet arcing portion pitch at the clearance region as described above and the lower portions of the ear portions of the elements (lower portion of 86 in FIG. 9) strike the outermost periphery (highest portion of 14 in FIG. 9) by point contact. In order to prevent this point striking action from occurring, the two contact surfaces between the element shoulder (saddle surface 1 in FIG. 9) and the ear of the element are formed in a concentric circular arc shape thereby bringing the ear portion and the ring into surface contact even when the elements pitch to improve the durability.

Moreover, a method which is known is disclosed in Japanese Laid-open Patent Publication No.06-010993(A)

and has an objective of improving the power transmission efficiency. In this method a rotational moment acts on the elements due to a frictional force acting between the pulley and the elements and a frictional force acting between the elements and the rings at the winding portion of the pulleys. Because the center of the moment at this time is almost located in the slanting region at the center between the principal planes, the result of the moment is such that the elements slip between the pulleys leaning slightly rearward towards the travel direction of the belt. In order to prevent this slippage, there is a means that provides a shape in the direction of the plate thickness of a support surface such that the point where the force acts in the radial direction due to tension in the ring acts on the outside away from the center of the direction of the plate thickness of the support surface that makes contact with the ring.

Even further, there is a method related to the clearance between the concave and convex portions of the coupling that is a technology closely related to the present invention. For example, in the method disclosed in Japanese Laid-Open Utility Model Publication No.62-037645(A), the gutter at the left and right of the arcing portion between the pulleys is reduced improving the power transmission efficiency and durability without obstructing the pitch of the elements close to the pulley outlet by means of making the clearance in the left and right directions of the coupling smaller than the clearance in the up and down direction.

None of these technologies, however, initiates a clearance reducing motion close to the driven pulley outlet nor do they improve the contact state between the outermost periphery of the ring and the ear portions of the elements.

For instance, according to the above-mentioned Japanese Laid-open Patent Publication No.02-225840(A), the main stated purpose is to create an example wherein the elements which detach the pulley at the driven pulley outlet to possess only the energy that dissipates the play (clearance), the driven pulley protrudes out and transverse elements are combined in front of the drive pulley by means of using transverse elements (elements) which have a center of gravity close to the slanting region of the transverse elements or higher than the slanting region. In this invention however, there is no mention whatever concerning the contact relationship between the ring and the elements nor does this invention prevent interference between the lower portions of the ear portions at the winding portions of the drive pulley and the driven pulley and the outermost periphery of the ring or interference between the lower portions of the ear portions and the outermost periphery of the ring caused by a pitching moment acting on the elements at the driven pulley outlet.

The pitching moment that acts on the elements at the driven pulley outlet is defined as a state in which frictional force in a direction opposite to the travel direction of the belt that acts on the elements at the pulley winding region functions such that pitching occurs at the driven pulley outlet due to the existence of the above-mentioned clearance.

This state is described using FIG. 10. This figure shows a state in which narrow conventional elements between a ring and a slot receive a pitching moment at the driven pulley outlet region and are leaning forward. Further, the dotted lines in the figure indicate elements which are not pitching. To begin, the pressing force between the elements at the driven pulley outlet region acts on the area close to the rocking edge 21 on the pitch arc and then a compressive force and a frictional force in the radial direction work together between the elements. In contrast, the transmission of power between the elements and the driven pulley acts on the center 2c of the V-surface 2 of the elements and by means of balancing these two forces, the element positions and state are maintained.

In addition, the existence of the above-mentioned clearance at the driven pulley outlet results in a state in which the forward elements are separated and positioned. Therefore, the elements close to this region are supported on the pulley by the V-surface while the pressing force between the elements functions to push out from the rear the area close to the rocking edge located above the V-surface. As a result of the occurrence of this type of moment (pitching moment), the elements at the driven pulley outlet are in a state leaning forward as shown in FIG. 10 and are released from the driven pulley.

When the clearance between the lower portion of the ear portion and the outermost peripheral surface of the ring is small due to the behavior of the elements as described above, a state will occur in which the lower surface of the ear portions 86d of the elements which are pitching due to the action of the pitching moment close to the driven pulley outlet strike the outermost peripheral surface of the ring.

Furthermore, according to the method described in the above-mentioned Japanese Laid-open Utility Model Publication No.62-037645(A), by means of making the clearance in the left and right directions of the coupling smaller than the clearance in the up and down direction, the gutters at the left and right of the elements close to the pulley outlet can be filled although it does not have any affect on the slanting of the elements mentioned above and consequently, cannot control damage to the ring caused by the lower portion of the ear portion and the outermost peripheral surface of the ring striking each other.

As another example, according to the method described in the above-mentioned Japanese Utility Model Publication No.05-008359(B), it was understood that by means of forming the two contact surfaces of the lower portion of the ear portion of the elements and the saddle surface in a concentric circular arc shape, although the contact surface pressure was reduced, the lower portion of the ear portion of the elements and the outermost peripheral surface of the ring made contact.

As another example, the above-mentioned Japanese Laid-open Patent Publication No.06-010993(A) mentioned only the saddle surface only but did not stipulate the contact relationship between the lower portion of the ear portion and the ring at all.

Even further, when the lower portion of the ear portion of the elements and the outermost peripheral surface of the ring made contact, the rotation moment of the elements was consumed due to the contact between the ring and the lower portion of the ear portion and there was concern that the action of clearance closure movement would effectively be eliminated.

It was also understood that the durability was affected by providing a ring comprising a plurality of layers of metal ring sheets wherein when the elements which received the pitching moment at the driven pulley outlet portion pitched and struck the outermost peripheral surface of the ring, a surface pressure proportional to the rotation moment would act at this contact point and a opposing force of this striking force would increase the surface pressure at the inside of the innermost periphery of the ring.

Moreover, when the pulley on the driven side is on the side of the winding diameter, there will be a dramatic effect on the speed difference in the ring and the elements with the maximum peripheral speed difference occurring at the innermost periphery of the ring and the outermost periphery of the ring. Therefore, when both the lower portion of the ear portion of the elements and the saddle surface simultaneously made contact squeezing the ring, the relative slipping movement of the layers of the rings would be impeded in addition to the above-mentioned problem of surface pressure occurring which was a subject of improvements in the transmission efficiency of the power.

SUMMARY OF THE INVENTION

The object of the present invention is to provide a metal V-belt that has improved durability without impeding the closure movement of the elements at the driven pulley outlet.

The metal V-belt related to the present invention is comprised such that the clearance in the thickness direction of the belt (for example, slot portion clearance $C_Y$ in the embodiment) between the slot portion disposed on the metal element members (for example, element 10 in the embodiment) and the metal element members (for example, ring 14 in the embodiment) is set larger than the clearance in the thickness direction of the belt (for example, coupling portion clearance $C_{NH}$ in the embodiment) of the coupling portion (for example, coupling portion 5 in the embodiment) that is comprised by the concave and convex portions disposed on the front surface and rear surface of the metal element members. By means of setting the clearance in this manner, contact between the lower portions of the ear portions and the outermost peripheral surface of the ring can be controlled without impeding the closure movement of the elements at the driven pulley outlet.

It is preferable to set the clearance in the thickness direction of the belt between the slot portion and the metal element members such that the outermost peripheral portion of the metal ring member does not make contact with the metal element member of the upper portion of the slot portion (lower portion of the ear portion 6 in the embodiment) close to the outlet of the driven pulley. In other words, the action of the above-mentioned pitching moment causes the elements to pitch at the driven pulley outlet resulting in the elements entering a pitched state. When the clearance between the ring and the slot is small in this pitched state, a state will occur in which the outermost peripheral portion of the ring and the lower portion of the ear portion make contact because of the leaning caused by this pitching action before the closest elements make contact. Consequently, taking into consideration the pitching action at the driven pulley outlet, it is preferable to set the clearance in the thickness direction of the belt between this ring and slot such that it becomes larger than the clearance in the thickness direction of the belt between the concave and convex portions of the front and rear couplings.

By means of these types of settings, the convex portion of the coupling makes contact with the concave portion of the closest element in a leaning state while the elements maintain the pitching moment when they are pushed out from the pulley at the driven pulley outlet. This makes it possible to prevent the outermost peripheral portion of the ring and the lower portion of the ear portion from making contact.

Because of this, it is possible to prevent the lower portion of the ear portion from striking the outermost peripheral portion of the ring and in addition there is also no occurrence of compressive stress that inserts and bends the ring at the lower portion of the ear portion and the saddle surface.

Further, because the pitching action of the elements at the driven pulley outlet forces out the closest elements, the outermost peripheral portion of the ring does not make contact with the lower portion of the ear portion and the clearance closure movement is effectively carried out. Therefore, the durability of the ring at the driven pulley outlet can be improved and the clearance closure movement of the elements can be improved as well.

In this manner, the present invention embodies the metal V-belt by means of setting the clearance in the thickness direction of the belt between the ring and the slot and the clearance in the thickness direction of the belt between the concave and convex portions of the couplings in order that the outermost peripheral portion of the ring does not make contact with the lower portion of the ear portion due to the pitching phenomenon of the elements at the driven pulley outlet when specifying the dimensions of the slot portion of the elements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
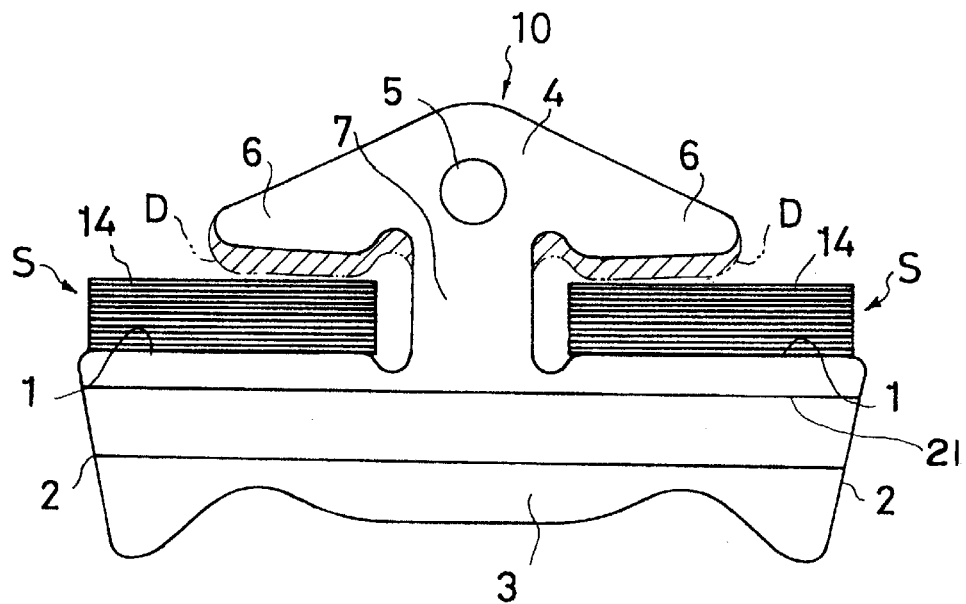
FIG. 1 is a front view showing the metal V-belt of the present invention.
Figure 8:
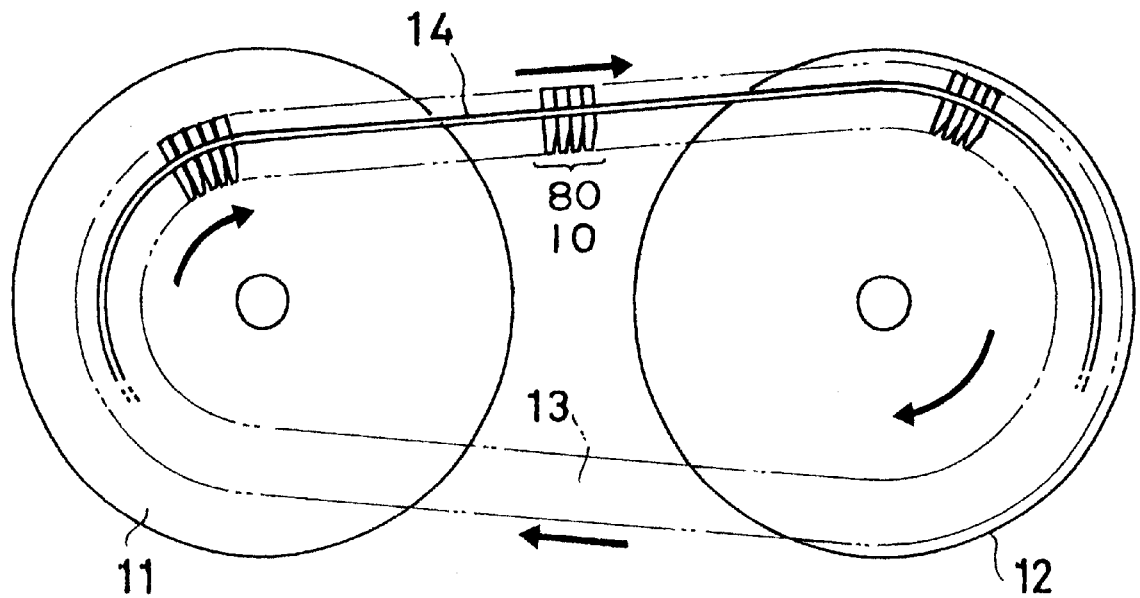
FIG. 8 is a compositional drawing of an infinite variable-speed drive that shows a wound state of the metal V-belt.
Figure 9:
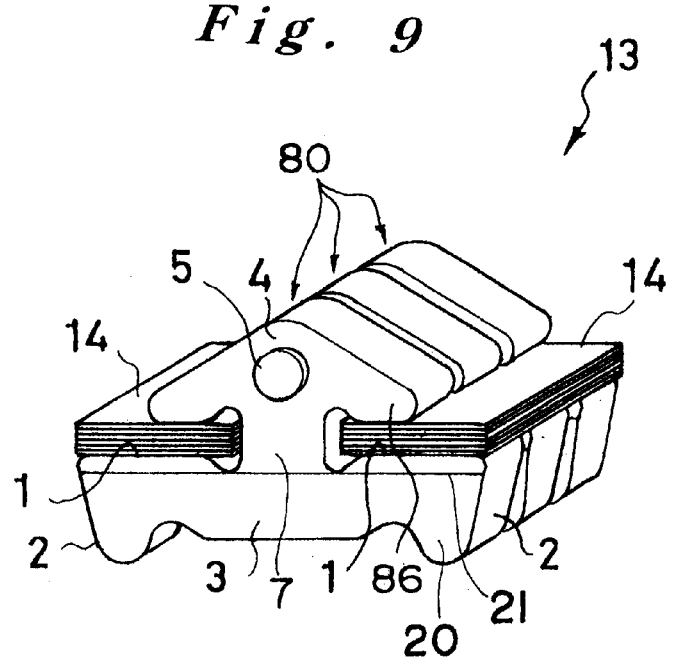
FIG. 9 is a compositional drawing showing the composition of the metal V-belt.
Figure 10:
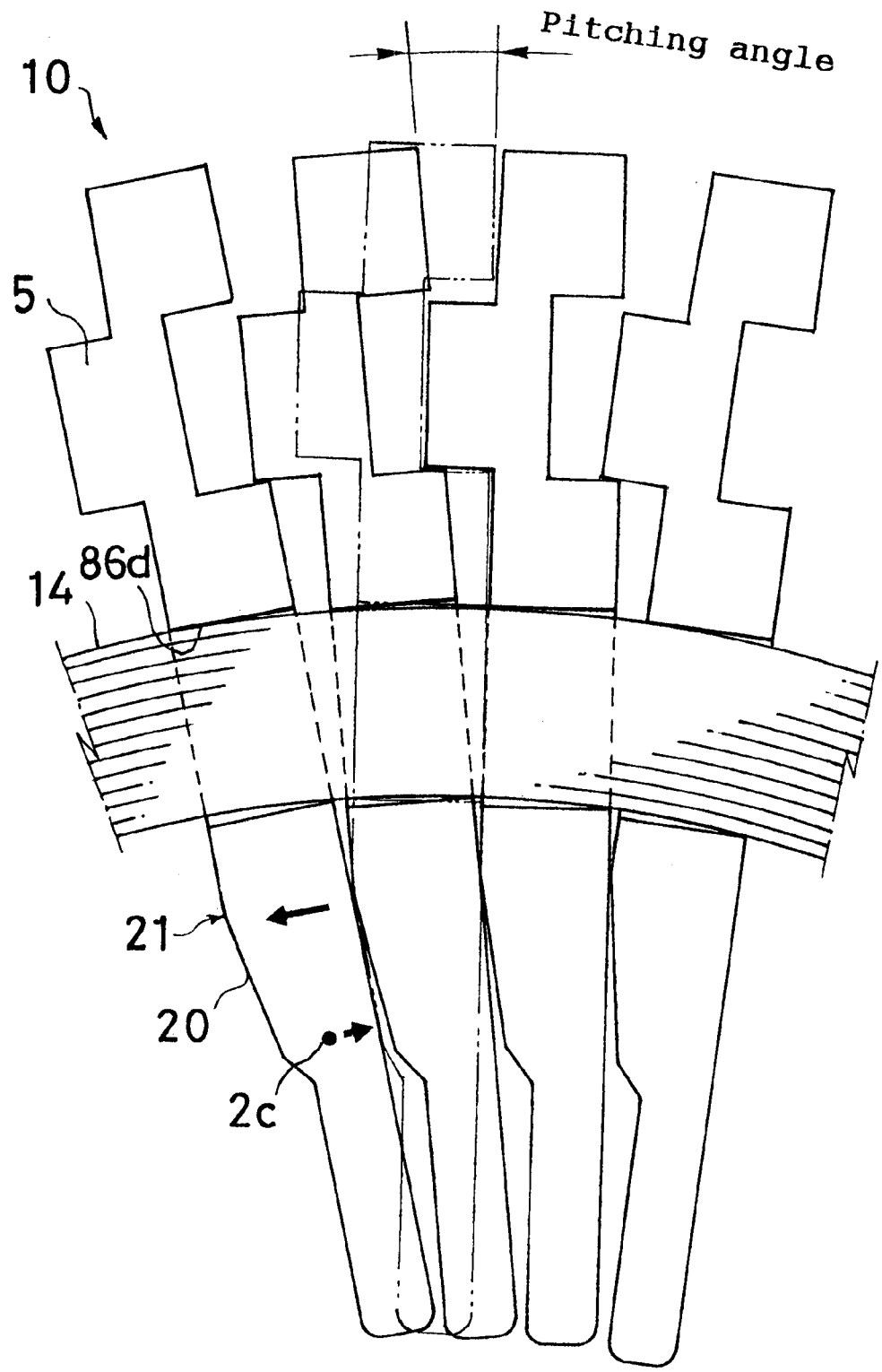
FIG. 10 is a conceptual view showing when the element members of a conventional metal V-belt are pitching due to a pitching moment in the driven pulley winding portion.

The metal V-belt of the present invention is a belt that can be used in an embodiment identical to the conventional metal V-belt previously shown in FIG. 8 and FIG. 9 and is a belt that has characteristics in the elements which comprise the metal V-belt 13. FIG. 1 shows an element 10 of the present invention. The region underneath the lower portion of the ear portion 6 with the hatch lines indicated by D shows differences between a conventional element.

These types of elements of the present invention can be comprised identical to conventional elements except for clearance $C_Y$ in the thickness direction of the belt between the ring 14 of the slot portion S and clearance $C_{NH}$ in the thickness direction of the belt between the concave and convex portions of the couplings. Namely, the present invention only modifies the dimensions of these two shapes and the composition of the elements can achieve a composition identical to conventional elements (for example, the elements shown in FIG. 9). Consequently, in the following description, identical symbols will be used for portions identical to conventional embodiments which have been described elements up to the present time and their descriptions will be omitted.

Figure 2:
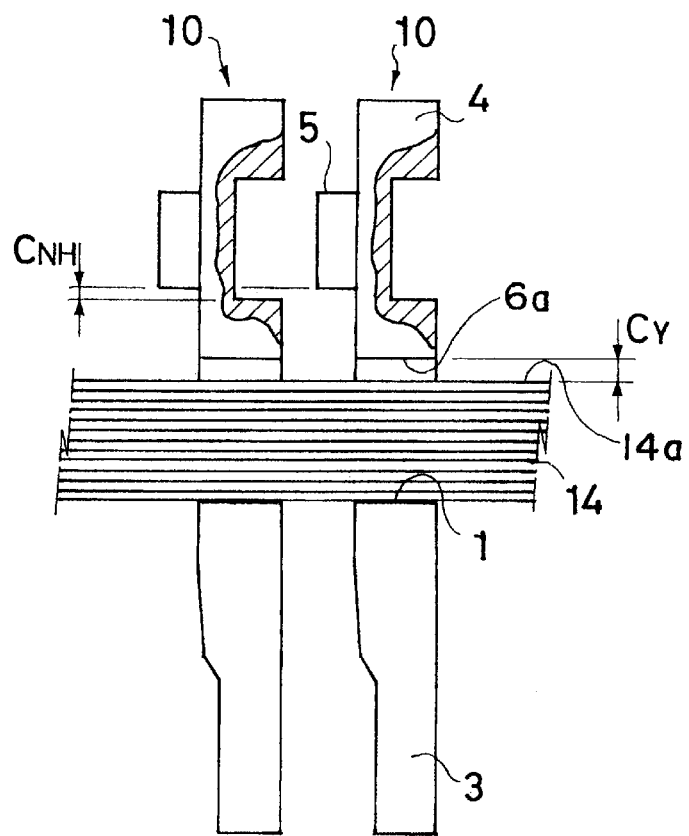
FIG. 2 is a descriptive view showing clearance of the metal element members of the above-mentioned metal belt.
Figure 3A:
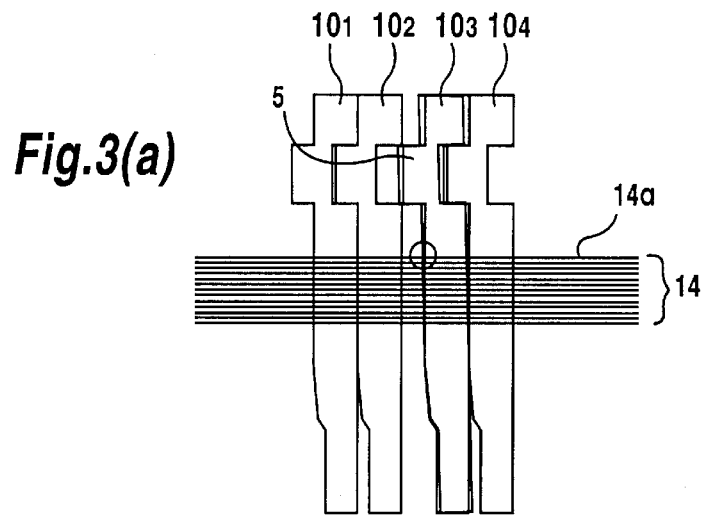
FIGS. 3(a)–3(c) are conceptual views showing the metal element members and the closest metal element members when the metal element members are leaning and a contact state between the metal ring member.

In the following the action of the element 10 of the present invention will be described. FIG. 2 shows a side view of the element 10 of the present invention. This figure shows clearance $C_Y$ (hereinafter referred to as simply slot portion clearance) in the thickness direction of the belt between the ring 14 and the slot portion S of the element and radial clearance $C_{NH}$ (hereinafter referred to as simply coupling portion clearance) in the thickness direction of the belt between the concave and convex portions of the couplings. FIGS. 3(a), (b) and (c) show typical examples of a case when slot portion clearance $C_Y$ is changed and the belt extends from the driven pulley outlet to the belt arcing portion (straight line portion) after which the elements 10 pitch and are released due to a pitching moment and how they make contact with the ring 14 or the closest element.

Moreover, in FIG. 3, ring 14 is simplified and indicated by a straight line. The element 10₃ on the center right side that has empty space between the elements in each figure is shown as an element pitching due to the pitching action at the pulley outlet and the element 10₄ to the right of element 10₃ is in a driven pulley wound state. Further, the two elements 10₁ and 10₂ on the left side away from the empty space in the center are shown in a state in which the belt arcing portion (straight line portion) are released from the pulley.

Figure 3B:
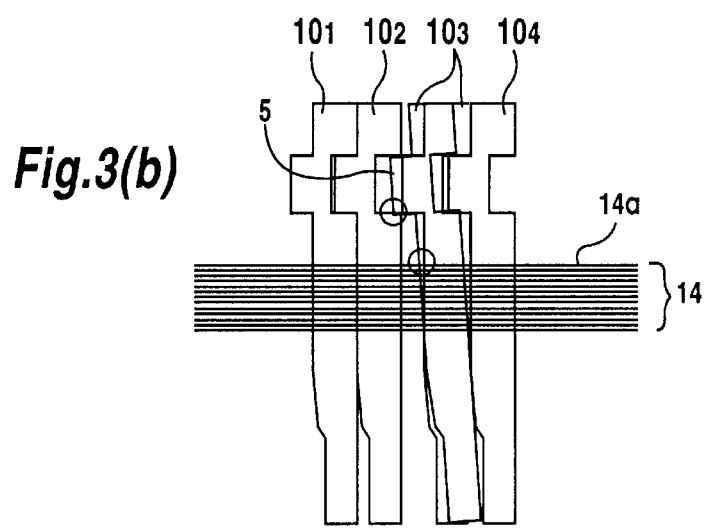
Figure 3C:
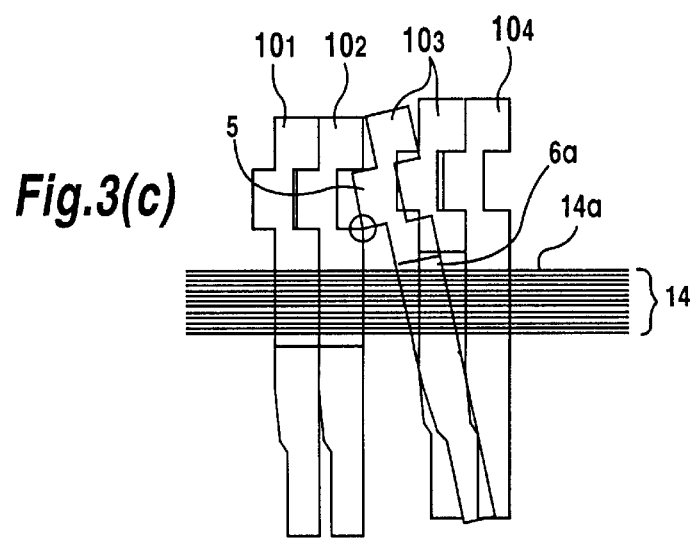

FIG. 3(a) shows when $C_Y<C_{NH}$ and the lean of the element 10₃ at this moment is controlled so the outermost peripheral portion 14a of the ring 14 and the lower portion 6a of the ear portion 6 make contact first. These mutual contact points are indicated by a "( )" symbol in each figure. FIG. 3(b) shows a state in which the concave and convex portions of the couplings 5 of the element 10₂ and the element 10₃, and the lower portion 6a of the ear portion of the element 10₃ and the outermost peripheral portion 14a of the ring make contact simultaneously. The clearance relationship at this time was $C_Y=1.88 C_{NH}$. FIG. 3(c) shows when $C_Y>=2 C_{NH}$. The concave and convex portions of the couplings 5 must make contact first at this time and in addition, clearance also exists between the lower portion 6a of the ear and the outermost peripheral portion 14a. Furthermore, in FIG. 3 hatching in the cross sectional portions indicating the concave portion of the coupling for descriptive purposes is omitted.

Figure 4:
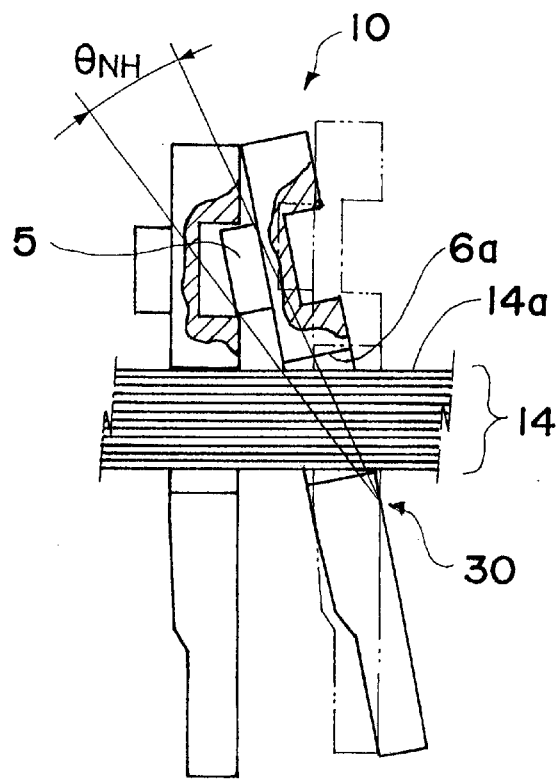
FIGS. 4(a) and 4(b) are descriptive views showing the metal element members and the closest metal element members when the metal element members are leaning and a contact angle between the metal ring member.
Figure 4:
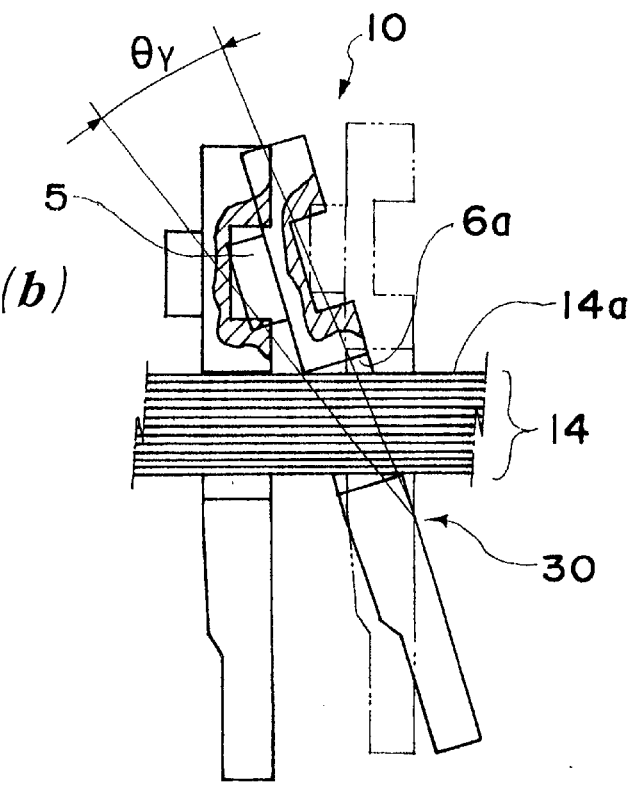

FIG. 4 is a conceptual view showing a state when the element 10 receives pitching and pitches at the driven pulley outlet. As described up to now, taking into consideration the positional relationship between the pressing force between the elements that acts on the pitch line at the driven pulley outlet and the center of the pulley V-surface that supports the elements, the element 10 pitches with the edge (rocking edge) of the upper side of the V-surface contact portion as a rotation center. Now, if the leaning angle of the element 10₃ is specified using the relationship between the closest element 10₂ and the ring 14, looking at the explanatory drawing, the angle will have a relationship of $\theta_{NH}<\theta_Y$ within the usage range of the metal V-belt for the element 10 of the present invention when the leaning angle is $\theta_{NH}$ at the moment when the convex and concave portions of the coupling 5 make contact and the leaning angle is $\theta_Y$ at the moment when the lower portion 6a of the ear portion 6 and the outermost peripheral portion 14a of the ring 14 make contact.

Figure 5A:
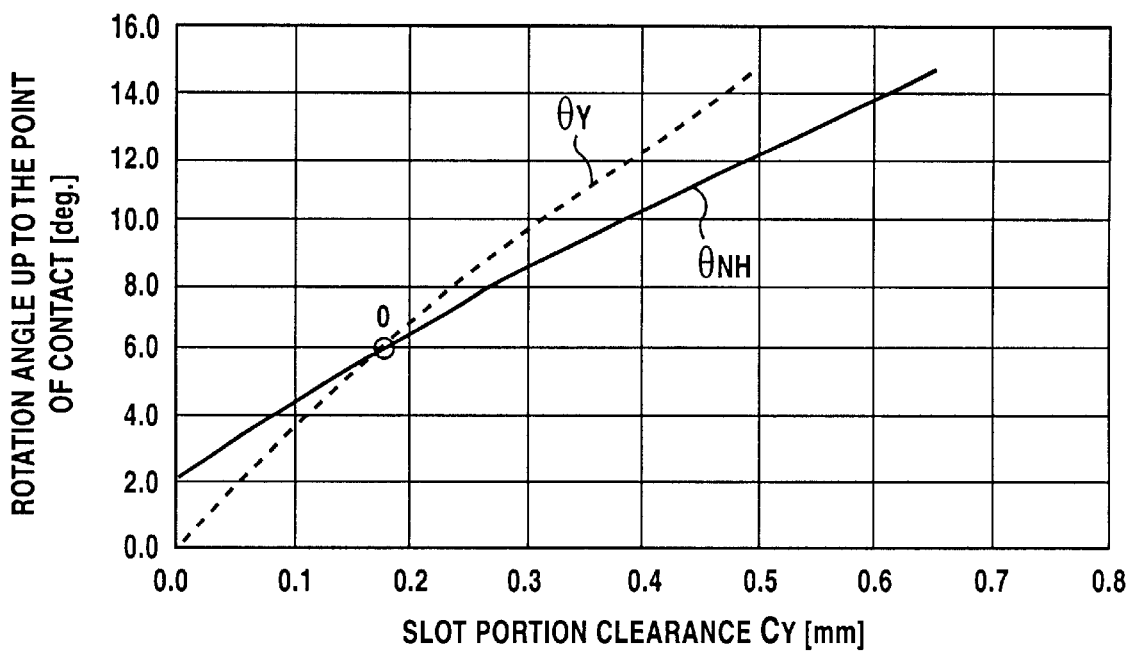
FIGS. 5(a) and 5(b) are descriptive views showing the relationship between the slot portion clearance of the metal element members and the leaning contact angle of the metal element members.
Figure 5B:
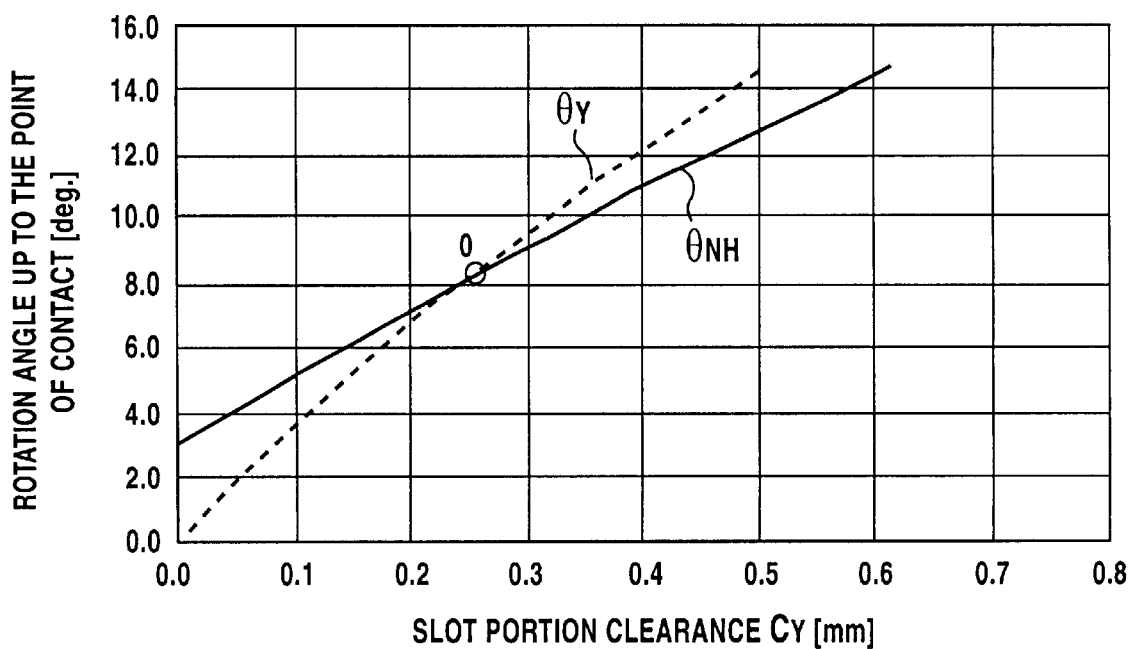

FIG. 5 shows two examples of the relationship between $\theta_Y$ and $\theta_{NH}$. FIG. 5(a) shows the relationship between both when the coupling portion clearance $C_{NH}=0.09$ mm and FIG. 5(b) shows the relationship between both when the coupling portion clearance $C_{NH}=0.13$ mm. In both figures, slot portion clearance $C_Y$ in the horizontal axis is taken as a rotation angle up to the point of contact in the vertical axis. $\theta_Y$ and $\theta_{NH}$ are calculated and plotted in both figures.

From these plots it can be seen that in the region where slot portion clearance $C_Y$ is small, the contact angle $\theta_Y$ between the lower portion 6a of the ear portion and the outermost peripheral portion 14a of the ring is smaller than the contact angle $\theta_{NH}$ between the mutual couplings. In this region the outermost peripheral portion 14a of the ring and the lower portion 6a of the ear portion make contact sooner than the mutual concave and convex portions of the coupling 5. However, the $C_Y$ value for $\theta_{NH}$ is smaller than the $C_Y$ value for $\theta_Y$ in the region in the figure where the $C_Y$ values are larger than the value at the intersecting point O. Therefore, the mutual concave and convex portions of the coupling 5 make contact first and the outermost peripheral portion 14a of the ring and the lower portion 6a of the ear portion do not make contact. Because of this, the object of the present invention is to make this possible in this region.

Figure 6:
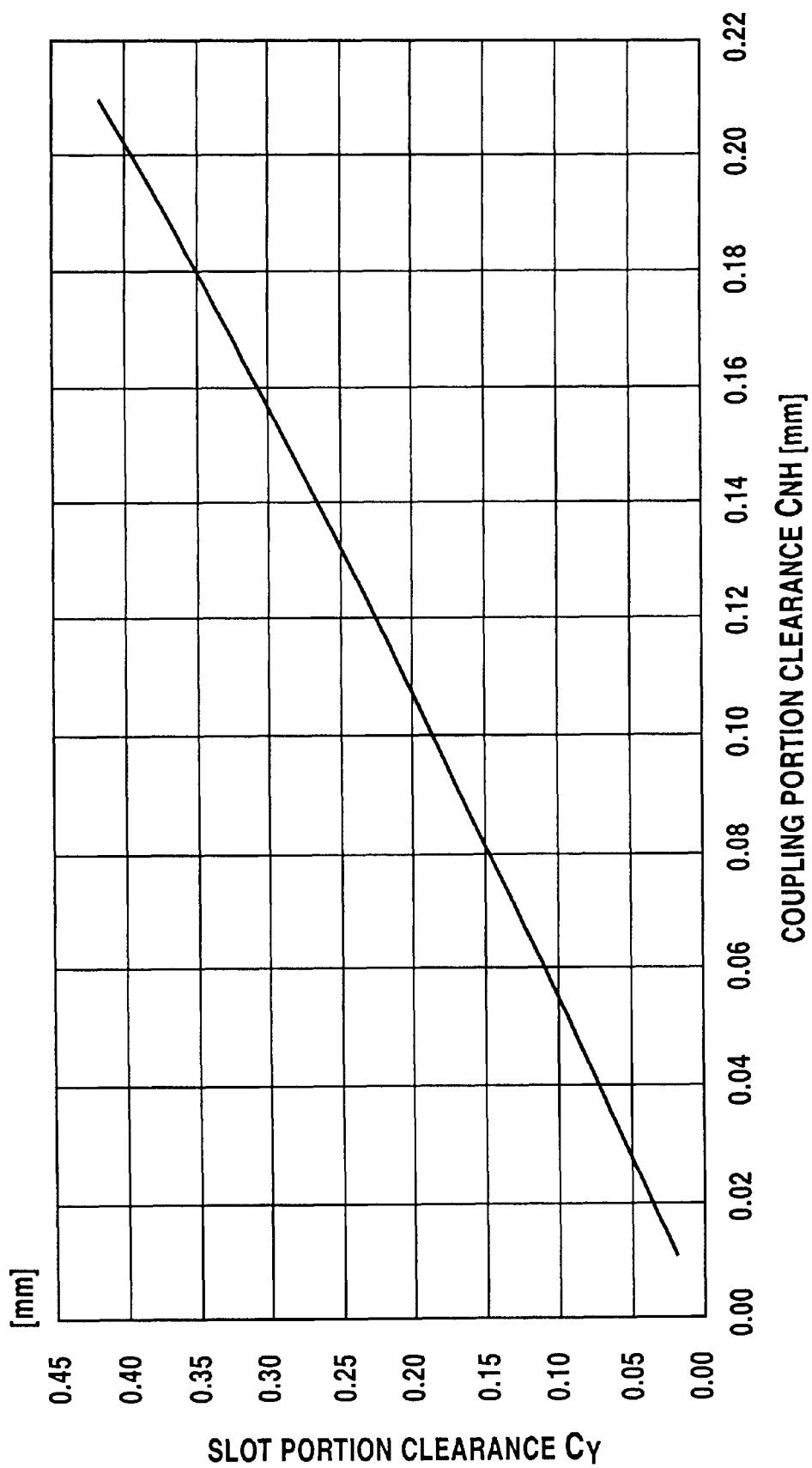
FIG. 6 is a descriptive view showing the relationship between the coupling portion clearance and the slot portion clearance of the metal element members wherein contact between the metal ring member and the lower portion of the ear portion and contact between the coupling concave portion and convex portions of the front and rear metal element members occur simultaneously.

FIG. 5 shows two types of coupling portion clearance $C_{NH}$. From a comparison of these two figures, if coupling portion clearance $C_{NH}$ is made larger, the intersecting point O of the above-mentioned $\theta_Y$ and $\theta_{NH}$ moves in the direction where slot portion clearance $C_Y$ is larger. Thereupon, the locus of intersecting point O was calculated when the coupling portion clearance $C_{NH}$ was changed. FIG. 6 shows the results.

FIG. 6 is line graph in which the coupling portion clearance $C_{NH}$ is shown in the horizontal axis and the slot portion clearance $C_Y$ in the vertical axis. In the figure the locus of the above-mentioned intersecting point is plotted. The line graph of this figure is a combination of when both the concave and convex portions of the coupling and the ring and the lower portion of the ear portion make contact at the same time. The mutual concave and convex portions of the front and rear coupling make contact sooner than the figure in the upper region and the outermost peripheral portion 14a of the ring and the lower portion 6a of the ear portion do not make contact.

Consequently, by means of setting the coupling portion clearance and the slot portion clearance to be in the upper region more than FIG. 6, a metal V-belt can be obtained in which and the outermost peripheral portion 14*a* of the ring and the lower portion 6*a* of the ear portion do not make contact at the driven pulley outlet. Moreover, if we look at the element 10 shown in this embodiment, this region is a region wherein the slot portion clearance is approximately two times more in comparison to the clearance between the concave and convex portions of the coupling.

Figure 7:
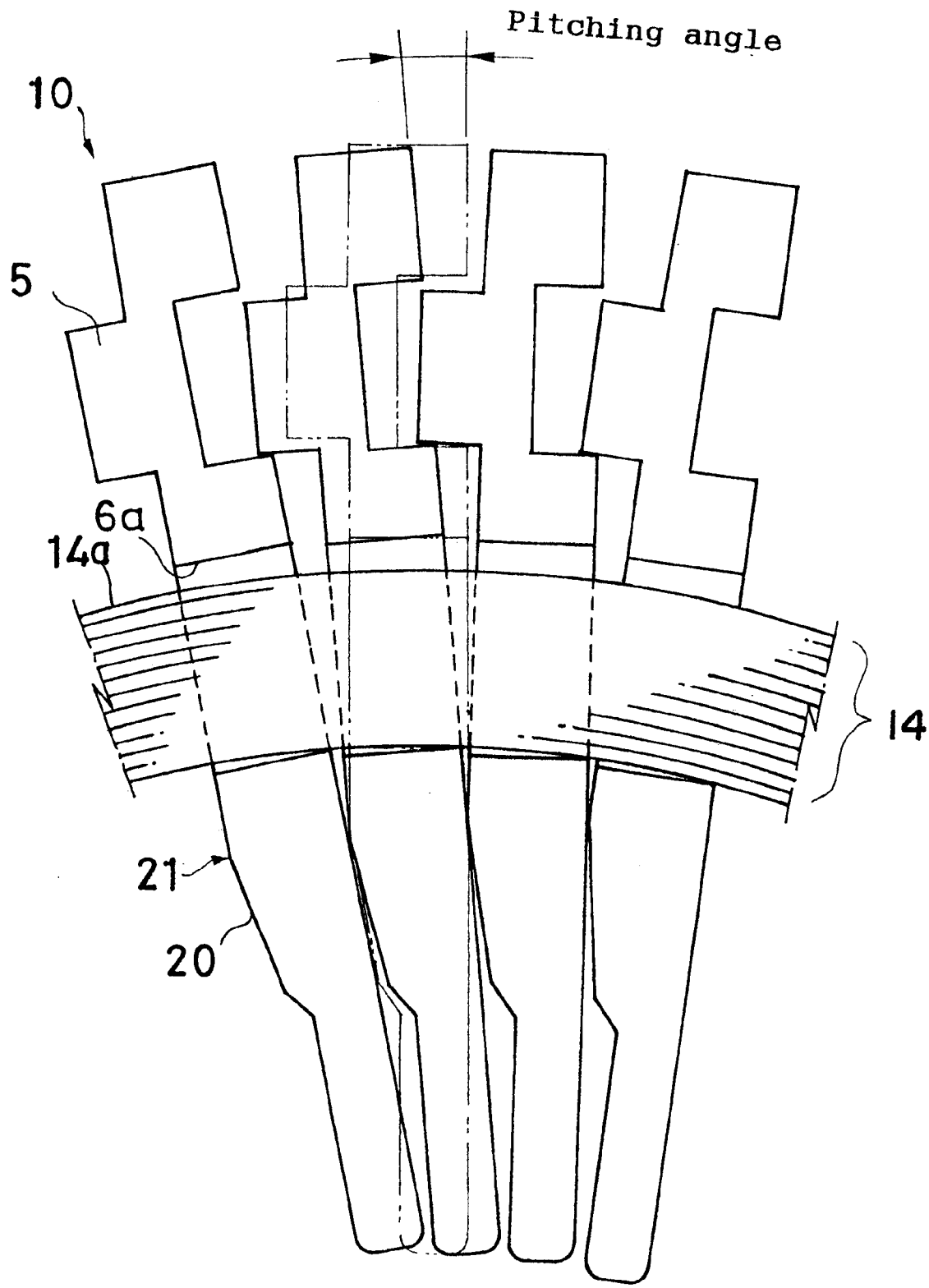
FIG. 7 is a conceptual view showing when the element members of the metal V-belt of the present invention are pitching due to a pitching moment in the driven pulley winding portion.

FIG. 1 and FIG. 7 show the element 10 of the metal V-belt of the present invention comprised by the method described up to now. At first, as shown in FIG. 1, for this element 10 the region underneath the lower portion of the ear portion 6 with the hatch lines indicated by D is eliminated and the slot portion clearance increased compared to a conventional element.

In addition, as shown in FIG. 7, even in a state in which an element receives a pitching moment and pitches at the driven pulley outlet, the metal V-belt comprised in this manner has sufficient clearance between and the lower portion 6*a* of the ear portion and the outermost peripheral portion 14*a* of the ring without the lower portion 6*a* of the ear portion and the outermost peripheral portion 14*a* of the ring making contact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A metal V-belt comprising:

an endless belt shaped metal ring member; and a plurality of metal element members supported along said metal ring member, said V-belt transmitting power between a drive pulley and a driven pulley, slot portions being formed on said metal element members accepting said metal ring member, and the front surface and rear surface of said metal element members having a concave portion and convex portion, respectively, to join said metal element members;

wherein when said metal element members are mounted to said metal ring member in order that said metal ring member is accepted in said slot portions, the convex portion or concave portion of said metal element members make contact with the concave portion or the convex portion of adjacent metal element members, respectively, when metal element members are leaning forward or backward in the direction of said metal ring member, and a slot portion clearance remains between said slot portions and said metal ring member, and the relationship between a radial clearance between the convex portion or concave portion of said metal element members which are in an erect state and the concave portion or convex portion of an adjacent metal element member, respectively, and said slot portion clearance, being set in order that the value of the slot portion clearance being greater than 1.88 times a value of the radial clearance.

2. The metal V-belt according to claim 1 wherein the value of said slot portion clearance being set to a value greater than two times the value of the radial clearance.

3. The metal V-belt according to claim 1 characterized by a leaning angle of said metal element members being set to a first leaning angle when said metal element members and the concave portion or convex portion of an adjacent metal element member make contact, and said first leaning angle being less than a second leaning angle when said metal element members lean and the leaning angle of said metal element members is said second leaning angle when the slot portion clearance is zero (0) in a state wherein said metal element members are mounted to said metal ring member in order that said metal ring member is accepted in said slot portion.

* * * * *